United States Patent [19]

Teichmann

[11] Patent Number: 5,209,014
[45] Date of Patent: May 11, 1993

[54] MOLDS FOR THE GROWING OF SEEDLINGS

[75] Inventor: Manfred Teichmann, Wittenbach, Switzerland

[73] Assignees: Spuhl AG, Switzerland; Klasmann-Deilmann GmbH, Fed. Rep. of Germany

[21] Appl. No.: 364,467

[22] Filed: Jun. 9, 1989

[30] Foreign Application Priority Data

Jun. 11, 1988 [DE] Fed. Rep. of Germany ... 8807619[U]

[51] Int. Cl.$^5$ .......................... A01G 9/02; C05G 3/04
[52] U.S. Cl. ............................................. 47/73; 71/903
[58] Field of Search ....................... 71/903, 904, 64.13; 47/34, 37, 34.11, 58, 1.2, DIG. 7, 65, 66, 73, 74

[56] References Cited

U.S. PATENT DOCUMENTS

| | | | |
|---|---|---|---|
| 3,467,609 | 9/1969 | Adams et al. .............................. | 47/65 |
| 3,472,644 | 10/1969 | Woodside ................................... | 71/1 |
| 3,805,531 | 4/1975 | Kistner ................................ | 61/36 R |
| 3,805,532 | 7/1985 | Kistner ................................ | 405/264 |
| 4,034,507 | 7/1977 | Dedolph ........................ | 71/64.13 X |
| 4,034,508 | 7/1977 | Dedolph ........................ | 71/64.13 X |
| 4,035,951 | 7/1977 | Dedolph ........................ | 71/64.13 X |
| 4,215,513 | 8/1980 | Dedolph ........................ | 71/64.13 X |
| 4,504,582 | 3/1985 | Swann ................................ | 71/904 X |
| 4,707,176 | 11/1987 | Durham ............................ | 71/903 X |
| 4,762,545 | 8/1988 | Youssef ............................. | 71/904 X |

FOREIGN PATENT DOCUMENTS 722589 9/1964 Canada ................................... 71/904

Primary Examiner—Carl D. Friedman
Assistant Examiner—Michele A. Van Patten
Attorney, Agent, or Firm—Baker, Maxham, Jester & Meador

[57] ABSTRACT

A mold for retaining a seedling during handling and transportation, whereby the mold is formed of turf, water, nutrients and a synthetic molding material. The dried form retaining mold form receives a seedling and then is packaged as needed for further handling prior to being planted and watered. The seedling then grows directly in the mold. The invention also includes the process and device for manufacturing such molds.

4 Claims, 2 Drawing Sheets

MOLDS FOR THE GROWING OF SEEDLINGS

FIELD OF THE INVENTION

The invention concerns a mold for growing a seedling whereby the seedling is held in the mold containing turf, nutrients, if any, as well as synthetic forming material. In addition, the invention concerns a device and method for manufacturing such molds.

BACKGROUND OF THE INVENTION

Plant seedlings or shoots typically are planted in individual pots, in a flat of several containers or simply in spaced locations in a flat. The plants are handled and transported in those containers until time to transplant them to a larger pot or into the ground. The costs for making and handling individual pots is relatively high and a recycling or refuse problem is created. Handling and transporting groups of plants in flats can be inconvenient.

It is desired to have a form retaining mold for the retention and growing of a seedling or shoot, which suffices without a flower pot or similar, discrete, external container, and which requires little fertilizer. Nevertheless, the seedling or shoot should be able to grow immediately upon watering and should be able to find within the very mold and in sufficient quantities the nutrients required for its growth, including water. The mold should also be made at an attractive cost.

SUMMARY OF THE INVENTION

In accordance with the present invention, the above purpose is accomplished in that the mold of the invention is formed of a dry mass, such as turf or soil or both, and includes a structure of open-cell foam in an amount of about 6 to 8% by weight relative to the dry mass, which foam consists of a hydrophilic polyurethane prepolymer. Such polymer is available commercially under the name HYPOL FHP. This polymer mixed in the turf provides the desired structural stability in a form retaining mold so that a separate container is not necessary.

Another reason for adding prepolymer in the smallest possible amount of about 6 to 8% by weight relative to the dry mass is cost. Its purpose is to afford the necessary firmness and stability to the turf mixture so that the mold without a pot can be handled and shipped as such, possibly in its appropriate packing such as bubble wrap. Since the invention concerns turf mixed with an open-cell synthetic material with low tensile strength, the seedling roots are allowed to grow freely through the mold and to absorb the required nutrients from the soil in the mold itself. Introduced into the surrounding soil, they are able to grow into that soil so that plants of any size, including trees, can be planted directly with the mold of this invention.

The prepolymer is added in an amount of about 6 to 8% by weight, preferably about 8% by weight, to the turf mixture and, after mixture with the turf mix, is hardened or cured to an open-cell or open-pore foam material.

Subsequently, water must be removed in its entirety, or for the most part, from the mold in order to prevent premature sprouting of the seedling. When the mold is dry, the seedling is introduced into the mold, which is then ready for shipment, possibly after appropriate packing.

The mold containing the small, started plant is then introduced on-site into the surrounding soil, watered, and the seedling begins to grow. Due to the chemical properties or the formulation of the hypol/turf system and water, the water stored in the foamlike material evaporates only very slowly. This process favors growth conditions. The synthetic material receives biological acceptance from the seedling and is free of toxins when leaving the manufacturing plant.

The turf mixture ratio is to be selected in accordance with conditions present at the time. Soil can also be used without turf or without significant supplement of turf, while turf can be used without significant amount of soil.

BRIEF DESCRIPTION OF THE DRAWING

The objects, advantages and features of the invention will be more readily perceived from the following detailed description when read in conjunction with the accompanying drawing, in which.

DESCRIPTION OF THE PREFERRED EMBODIMENTS

Figure 1:
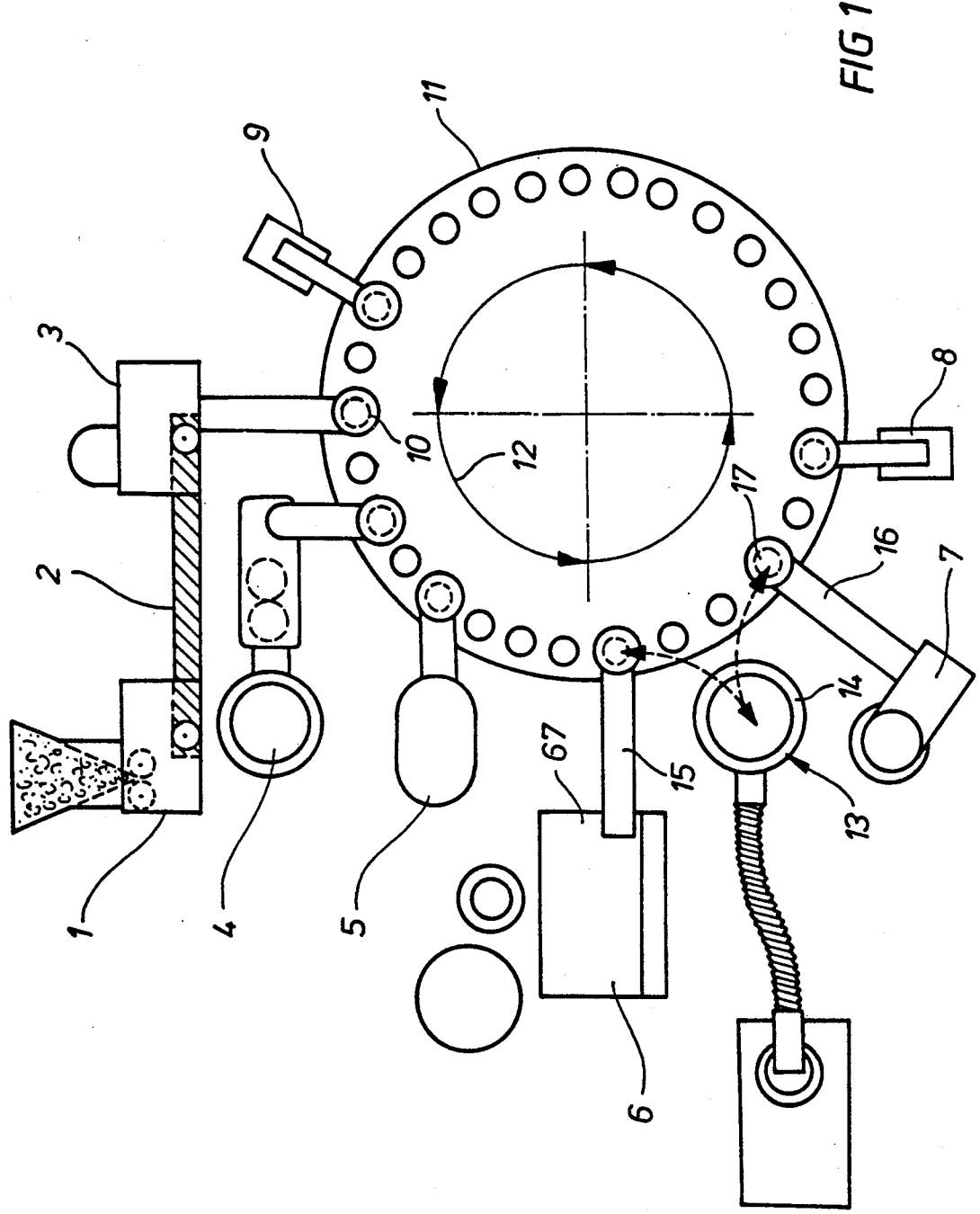
FIG. 1 is a schematic illustration of a device for the manufacture of molds in accordance with the invention.

FIG. 1 shows the introduction of turf in very coarse form into turf grinder 1 via a typical feed hopper, the turf including fibers and such which are ground in the turf grinder. The ground turf then drops onto conveyor belt 2, where it proceeds through turf dose station 3. The dose station ensures that only a specific dry amount of this turf, as determined by volume unit, is introduced into a mold tool 10 arranged within tool table 11. Note that the tool table has provision to retain a plurality of mold tools. The tool table rotates counter clockwise as indicated by arrow 12, and the mold tool containing the dry turf proceeds under water dose station 4, where appropriate additives may be introduced into the water, and a specific amount of water is introduced into the tool and into the turf contained therein.

Instead of feeding turf into the feed hopper of turf grinder 1, it is also possible to introduce a soil and turf mixture at that point. The mold tool 10 is then to be filled via dose station 3 as described above.

After mixing water and nutrients in dose station 4, the mold tool proceeds to premix station 5, where a stirrer moves into the tool cavity and stirs the turf or water-turf mixture to a thick pulp.

The mold tool then proceeds to dose station 6 where the hydrophilic polyurethane prepolymer (hypol) from container 25 is added in the preferred exact ratio of about 8% by weight relative to the dry mass.

In the area between station 6 and mix station 7 is cleaning station 13 featuring its own chamber 14 in which water is used to clean. The material transport arm 15 of dose station 6 can be swung into this chamber. This cleaning procedure is carried out only after completion of the work, that is, when the system is taken out of operation, in order to prevent the introduction of the synthetic hypol into the mix station. In addition, this cleaning chamber 14 of cleaning station 13 also makes it possible for mixing arm 16 of mix station 7 to swing into the chamber, as shown by the arrows, and also to be rinsed with water at that point.

After completion of the run, that is, after mixing hypol in dose station 6, the tool travels to the area of mix station 7, where mix arm 16 is present, equipped with stirrer 17, which is introduced into the tool cavity from above and which stirs into a ready-to-use mass the hypol-water-turf mixture. This mass has a virtually paste-like consistency. If the mixture pot were to be turned upside down, it would not flow out of the tool in and of itself.

Figure 2:
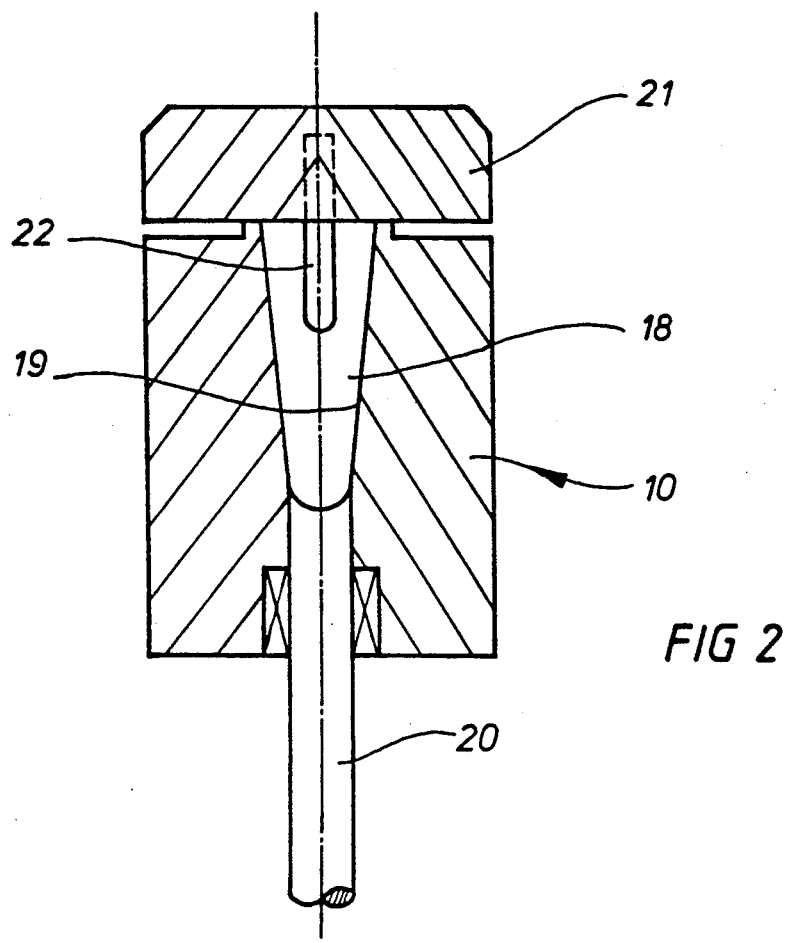
FIG. 2 is an enlarged axial section through a mold tool used in the apparatus of FIG. 1.
Figure 3:
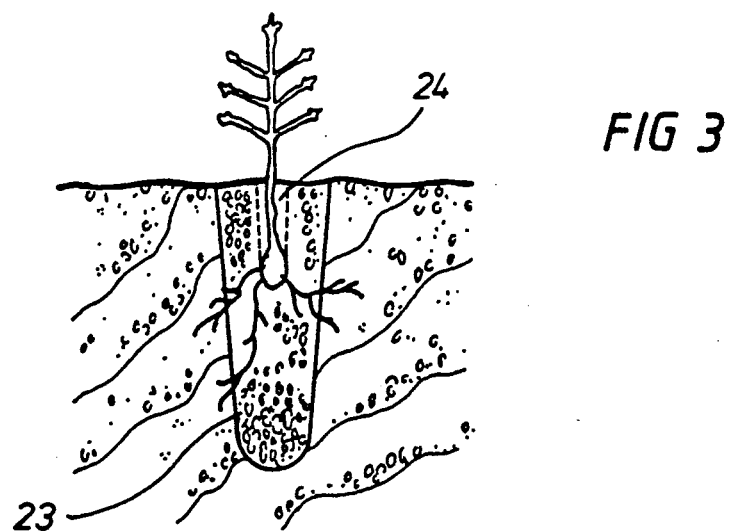
FIG. 3 shows a mold introduced into the soil in accordance with the invention to illustrate growth and set-up.

FIG. 2 shows the mold tool itself. It consists of tool body 10, which by way of example is made of a steel part featuring tool cavity 18 on the inside. In other words, the material is introduced into this tool cavity, that is, the turf through dose station 3, water through dose station 4 and synthetic material through dose station 6. Tool cavity 18 is coated with teflon layer 19 on the inside, and the tool mold is covered at the top with cover 21. The cover features projecting pin 22 protruding axially downward, and forming recess 24 in mold 23 (as shown in FIG. 3) in which the seedling can be pressed. Cover 21 is arranged on a side plane of tool 10 via a hinge and can therefore be raised or lowered.

Cover 21 has remained open to station 8 of the mold tool. At that point the cover is lowered so that the tool is closed and the synthetic material is then allowed to cure or react accordingly with the water-turf mixture. This requires about 2.5 minutes, during which time the mold tool remains on rotary disc 11 and, upon completion of this time, proceeds to station 9, where the completed mold 23 is ejected.

Cover 21 is then opened in station 9 and ejector 20 is moved up on an axial direction, whereby mold 23, now complete, is ejected and is conveyed away from the production machine, for example through a slide, vibrating equipment, a conveyor belt or similar device. It then proceeds to a dry station where it is dried until virtually no more water is contained therein. After the drying process, mold 23 then receives the desired seedling and is ready for shipment.

A significant advantage of the system of this invention is the continuous process with which molds 23 can be manufactured relatively fast in large quantities and at low cost. No external containers are required.

In view of the above description, it is likely that modifications and improvements will occur to those skilled in the art which are within the scope of the accompanying claims.

What is claimed is:

1. A mold for growing a seedling, the mold comprising:
   a dry mass consisting of ground turf mixture;
   synthetic material comprising an open-cell foam material comprising hydrophilic polyurethane prepolymer in an amount of about 6 to 8% by weight relative to the dry mass; and
   water sufficient to facilitate reaction of the synthetic material in the mixture with the dry mass and water;
   said synthetic material, when mixed with said dry mass and water, permitting said mold, when dried and all water has been removed, to be self-supporting and to retain a predetermined shape including a recess formed therein adapted to retain a seedling without being maintained by an encompassing container.

2. The mold recited in claim 1, and further comprising plant nutrients mixed in with said dry mass and said synthetic material.

3. The mold recited in claim 1, wherein said synthetic material comprises about 8% by weight relative to said dry mass.

4. A mold for growing a seedling, the mold comprising:
   a dry mass consisting of ground turf mixture;
   synthetic material comprising an open-cell foam material comprising hydrophilic polyurethane prepolymer in an amount of about 6 to 8% by weight relative to the dry mass; and
   water sufficient to facilitate reaction of the synthetic material in the mixture with the dry mass and water;
   said synthetic material, when mixed with said dry mass and water, permitting said mold to be self-supporting and to retain a predetermined shape including a recess therein adapted to retain a seedling without being maintained by an encompassing container, said mold being prepared by an automated continuous method comprising the steps of:
   sequentially arranging a mold tool in each of a plurality of workstations in a rotary table, each mold tool being shaped and configured to make one said mold therein;
   introducing a ground turf mixture dry mass into each mold tool in turn;
   introducing water into the dry mass in each mold tool;
   introducing a synthetic material comprising hydrophilic polyurethane prepolymer into the dry mass and water mixture in a ratio of about 6 to 8% by weight relative to the dry mass;
   mixing the dry mass, water and synthetic material together;
   curing the mixture in each mold tool having a projecting pin for forming a recess in the mold;
   drying the mixture in each mold tool to remove excess water; and
   ejecting the cured mold from each mold tool in turn.

* * * * *